(12) United States Patent
Wolf et al.

(10) Patent No.: US 11,580,106 B2
(45) Date of Patent: *Feb. 14, 2023

(54) ROBUSTNESS METRICS FOR OPTIMIZATION OF QUERY EXECUTION PLANS

(71) Applicant: SAP SE, Walldorf (DE)

(72) Inventors: Florian Wolf, Ilmenau (DE); Michael Brendle, Ilmenau (DE); Norman May, Karlsruhe (DE); Paul Willems, Heidelberg (DE); Kai-Uwe Sattler, Ilmenau (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,608

(22) Filed: Nov. 17, 2021

(65) Prior Publication Data

US 2022/0075781 A1 Mar. 10, 2022

Related U.S. Application Data

(63) Continuation of application No. 16/428,734, filed on May 31, 2019, now Pat. No. 11,204,921.

(60) Provisional application No. 62/679,285, filed on Jun. 1, 2018.

(51) Int. Cl.
*G06F 16/245* (2019.01)
*G06F 16/2453* (2019.01)

(52) U.S. Cl.
CPC .. *G06F 16/24545* (2019.01); *G06F 16/24537* (2019.01)

(58) Field of Classification Search
CPC ............... G06F 16/24545; G06F 16/24537
See application file for complete search history.

(56) References Cited

U.S. PATENT DOCUMENTS

| 2008/0235193 A1* | 9/2008 | Hattori | G06F 16/8365 |
| 2016/0203404 A1* | 7/2016 | Cherkasova | G06N 5/04 706/12 |
| 2018/0165331 A1* | 6/2018 | Zhang | G06F 16/24532 |

OTHER PUBLICATIONS

Abhirama, M. et al., "On the stability of plan costs and the costs of plan stability." *Proceedings of the VLDB Endowment*, 3(1-2):1137-1148, Sep. 2010.

(Continued)

*Primary Examiner* — Baoquoc N To
(74) *Attorney, Agent, or Firm* — Mintz Levin Cohn Ferris Glovsky and Popeo, P.C.

(57) ABSTRACT

A method may include responding to a query to retrieve data from a database by identifying a plurality of query execution plans. An overall robustness value may be determined for each query execution plan. The overall robustness value of a query execution plan may correspond to a sum of individual robustness values for each operator included in the query execution plan. Each operator may have an individual robustness value that corresponds to a first change in a total cost of a query execution plan including the operator relative to a second change in an output cardinality of the operator. One of the plurality of query execution plans may be selected based on the overall robustness value of each of the plurality of query execution plans. The query may be executed by performing a sequence of operators included in the selected one of the plurality of query execution plan.

20 Claims, 9 Drawing Sheets

(56) References Cited

OTHER PUBLICATIONS

Alyoubi, K. H. "*Database query optimisation based on measures of regret*." PhD thesis, Birkbeck, University of London, 2016.

Alyoubi, K. H. et al., "Ordering selection operators using the minmax regret rule." arXiv preprint arXiv:1507.08257, 2015.

Babcock, B. et al., "Towards a robust query optimizer: A principled and practical approach." In *Proceedings of the 2005 ACM SIGMOD International Conference on Management of Data*, SIGMOD '05, pp. 119-130, New York, NY, USA, 2005. ACM.

Babu, S. et al., "Proactive re-optimization." In *Proceedings of the 2005 ACM SIGMOD International Conference on Management of Data*, SIGMOD '05, pp. 107-118, New York, NY, USA, 2005. ACM.

Charikar, M. et al., "Towards estimation error guarantees for distinct values." In *Proceedings of the nineteenth ACM SIGMOD-SIGACT-SIGART symposium on Principles of database systems*, SIGMOD '00, pp. 268-279, New York, NY, USA, 2000. ACM.

Cormen, T. H. et al., "*Introduction to Algorithms, Third Edition*." The MIT Press, 3rd edition, 2009.

D., Harish, et al., "Identifying robust plans through plan diagram reduction." *Proceedings of the VLDB Endowment*, 1(1):1124-1140, Aug. 2008.

Graefe, G. et al., "*Robust Query Processing (Dagstuhl Seminar 10381), vol. 10381 of Dagstuhl Seminar Proceedings*," Leibniz-Zentrum für Informatik, Germany, 2010. Schloss Dagstuhl.

Graefe, G. et al., "Robust query processing (dagstuhl seminar 12321)." *Dagstuhl Reports*, 2(8):1-15, 2012.

Graefe, G. et al., "Robust performance in database query processing (Dagstuhl seminar 17222)." *Dagstuhl Reports*, 7(5):169-180, 2017.

Hueske, F. "*Specification and optimization of analytical data flows*." PhD thesis, TU Berlin, 2016.

Ioannidis, Y. E. et al., "On the propagation of errors in the size of join results." In *Proceedings of the 1991 ACM SIGMOD International Conference on Management of Data*, SIGMOD '91, pp. 268-277, New York, NY, USA, 1991. ACM.

Leis, V. et al., "How good are query optimizers, really?" *Proceedings of the VLDB Endowment*, 9(3):204-215, Nov. 2015.

Leis, V. et al., "Query optimization through the looking glass, and what we found running the join order benchmark." *The VLDB Journal*, pp. 1-26, Sep. 2017.

Lohman, G. "Query optimization-are we there yet?" In *Datenbanksysteme fur Business, Technologie und Web*, BTW '17. Gesellschaft für Informatik, Bonn, 2017.

Lohman, G. M. "Is query optimization a solved problem." In *Proceedings of the Workshop on Database Query Optimization*, p. 13. Oregon Graduate Center Comp. Sci. Tech. Rep, 2014.

Moerkotte, G. et al., "Preventing bad plans by bounding the impact of cardinality estimation errors." *Proceedings of the VLDB Endowment*, 2(1):982-993, Aug. 2009.

Scheufele, W. et al., "On the complexity of generating optimal plans with cross products (extended abstract)." In *Proceedings of the Sixteenth ACM SIGACT-SIGMOD-SIGART Symposium on Principles of Database Systems*, PODS '97, pp. 238-248, New York, NY, USA, 1997. ACM.

Selinger, P. G. et al., "Access path selection in a relational database management system." In *Proceedings of the 1979 ACM SIGMOD International Conference on Management of Data*, SIGMOD '79, pp. 23-34, New York, NY, USA, 1979. ACM.

Wolf, F. et al., "On the calculation of optimality ranges for relational query execution plans." In *Proceedings of the 2018 ACM SIGMOD International Conference on Management of Data*, SIGMOD '18, New York, NY, USA, 2018. ACM.

Yin, S. et al., "Robust query optimization methods with respect to estimation errors: A survey." *SIGMOD Record*, 44(3):25-36, Dec. 2015.

\* cited by examiner

ROBUSTNESS METRICS FOR OPTIMIZATION OF QUERY EXECUTION PLANS

CROSS REFERENCE TO RELATED APPLICATION

This application is a continuation of application Ser. No. 16/428,734, filed on May 31, 2019, entitled "ROBUSTNESS METRICS FOR OPTIMIZATION OF QUERY EXECUTION PLANS," which claims priority to U.S. Provisional Patent Application Ser. No. 62/679,285 filed Jun. 1, 2008, entitled "ROBUSTNESS METRICS FOR RELATIONAL QUERY EXECUTION PLANS," the disclosures of which are incorporated herein by reference in their entirety.

TECHNICAL FIELD

The subject matter described herein relates generally to database processing and more specifically to optimizing query execution plans for accessing data stored in a database.

BACKGROUND

A database may be configured to store a plurality of data records. For example, in a relational database, the data records may be stored as rows in one or more database tables. The database may be coupled with a database management system (DBMS) configured to handle requests to access the data records stored in the database. For instance, the database management system may support queries to retrieve data from the database including, for example, structured query language (SQL) statement and/or the like. The database management system may respond to a query by operating on the data records stored in the database including by, for example, selecting, joining, updating, inserting, and/or deleting one or more corresponding rows in the database tables.

SUMMARY

Systems, methods, and articles of manufacture, including computer program products, are provided for executing a query in a database. In some example embodiments, there is provided a system that includes at least one processor and at least one memory. The at least one memory may include program code that provides operations when executed by the at least one processor. The operations may include: responding to a query to retrieve data from a database by at least identifying a plurality of query execution plans; determining, for each of the plurality of query execution plans, an overall robustness value corresponding to a sum of individual robustness values for each operator included in the query execution plan, each operator having an individual robustness value that corresponds to a first change in a total cost of a query execution plan including the operator relative to a second change in an output cardinality of the operator; selecting, based at least on the overall robustness value of each of the plurality of query execution plans, one of the plurality of query execution plan for executing the query; and executing the query in accordance with the selected one of the plurality of query execution plan, the query being executed by at least performing a sequence of operators included in the selected one of the plurality of query execution plan.

In some variations, one or more features disclosed herein including the following features can optionally be included in any feasible combination. The individual robustness value may include a cardinality-slope robustness value. The cardinality-slope robustness value of each operator may correspond to a slope of a parametric cost function modeling the total cost of the query execution plan including the operator relative to the output cardinality of the operator.

In some variations, the individual robustness value may include a selectivity-slope robustness value. The selectivity-slope robustness value of each operator may correspond to a slope of a parametric cost function modeling the total cost of query execution plan including the operator relative to a selectivity of the operator. The selectivity of the operator may correspond to an output size of the operator relative to a maximum output size of the operator.

In some variations, the individual robustness value may include a cardinality-integral robustness value. The cardinality-integral robustness value of the each operator may correspond to an integral of a parametric cost function modeling the total cost of the query execution plan including the operator relative to the output cardinality of the operator. The integral may be bound between a lower cardinality bound and an upper cardinality bound.

In some variations, the overall robustness value of the query execution plan may be a weighted sum of the individual robustness values for each operator included in the query execution plan. A first operator included in the query execution plan may be assigned a higher weight than a second operator included in the query execution plan based at least on the first operator being more prone to a cardinality estimation error than the second operator.

In some variations, the one of the plurality of query execution plans may be selected based at least on the one of the plurality of query execution plans having a lowest overall robustness value.

In some variations, the one of the plurality of query execution plans may be selected based at least on the one of the plurality of query execution plans being associated with an overall robustness value that does not exceed a threshold value.

In some variations, the total cost of the query execution plan may correspond to a sum of a quantity of time and/or a quantity of computational resources required to perform each operator included in the query execution plan.

In some variations, the output cardinality of the operator may correspond to an output size of the operator.

In some variations, the plurality of query execution plans may be identified based at least on a cost of each of the plurality of query execution plans. The plurality of query execution plans may include a threshold quantity of query execution plans having a lowest cost. A query execution plan may be identified to be part of the plurality of query execution plans based at least on a cost of the query execution plan not exceeding a cost of a lowest cost query execution plan by a threshold value.

In another aspect, there is provided a method for executing a query in a database. The method may include: responding to a query to retrieve data from a database by at least identifying a plurality of query execution plans; determining, for each of the plurality of query execution plans, an overall robustness value corresponding to a sum of individual robustness values for each operator included in the query execution plan, each operator having an individual robustness value that corresponds to a first change in a total cost of a query execution plan including the operator relative to a second change in an output cardinality of the operator;

selecting, based at least on the overall robustness value of each of the plurality of query execution plans, one of the plurality of query execution plan for executing the query; and executing the query in accordance with the selected one of the plurality of query execution plan, the query being executed by at least performing a sequence of operators included in the selected one of the plurality of query execution plan.

In some variations, one or more features disclosed herein including the following features can optionally be included in any feasible combination. The individual robustness value may include a cardinality-slope robustness value. The cardinality-slope robustness value of each operator may correspond to a slope of a parametric cost function modeling the total cost of the query execution plan including the operator relative to the output cardinality of the operator.

In some variations, the individual robustness value may include a selectivity-slope robustness value. The selectivity-slope robustness value of each operator corresponds to a slope of a parametric cost function modeling the total cost of query execution plan including the operator relative to a selectivity of the operator. The selectivity of the operator may correspond to an output size of the operator relative to a maximum output size of the operator.

In some variations, the individual robustness value may include a cardinality-integral robustness value. The cardinality-integral robustness value of the each operator may correspond to an integral of a parametric cost function modeling the total cost of the query execution plan including the operator relative to the output cardinality of the operator. The integral may be bound between a lower cardinality bound and an upper cardinality bound.

In some variations, the overall robustness value of the query execution plan may be a weighted sum of the individual robustness values for each operator included in the query execution plan. A first operator included in the query execution plan may be assigned a higher weight than a second operator included in the query execution plan based at least on the first operator being more prone to a cardinality estimation error than the second operator.

In some variations, the one of the plurality of query execution plans may be selected based at least on the one of the plurality of query execution plans having a lowest overall robustness value and/or an overall robustness value that does not exceed a threshold value.

In some variations, the plurality of query execution plans may include a threshold quantity of query execution plans having a lowest cost and/or a plurality of query execution plans whose costs do not exceed a cost of a lowest cost query execution plan by a threshold value.

In another aspect, there is provided a computer program product that includes a non-transitory computer readable medium storing instructions. The instructions may cause operations when executed by at least one data processor. The operations may include: responding to a query to retrieve data from a database by at least identifying a plurality of query execution plans; determining, for each of the plurality of query execution plans, an overall robustness value corresponding to a sum of individual robustness values for each operator included in the query execution plan, each operator having an individual robustness value that corresponds to a first change in a total cost of a query execution plan including the operator relative to a second change in an output cardinality of the operator; selecting, based at least on the overall robustness value of each of the plurality of query execution plans, one of the plurality of query execution plan for executing the query; and executing the query in accordance with the selected one of the plurality of query execution plan, the query being executed by at least performing a sequence of operators included in the selected one of the plurality of query execution plan.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or statements or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to query execution planning, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
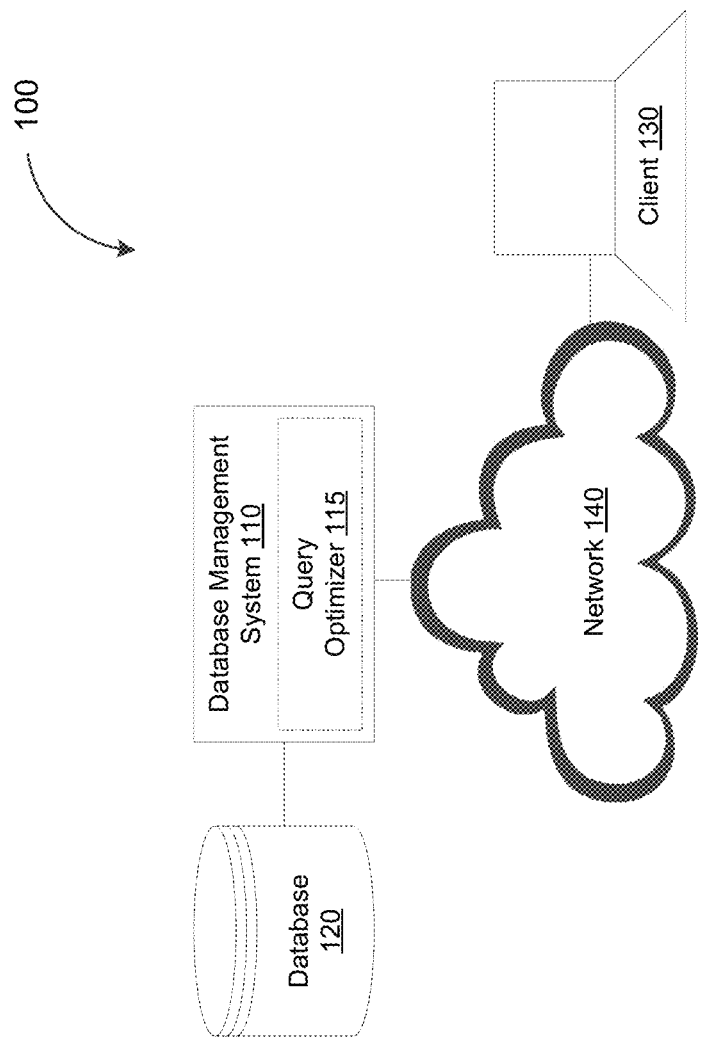
FIG. 1 depicts a system diagram illustrating a database system, in accordance with some example embodiments.

In order to retrieve data from a database, a client may submit a query to a database management system (DBMS) coupled with the database. The database management system may include a query optimizer configured to generate multiple query execution plans for the query. Each query execution plan may include a different sequence of operators for executing the query. Accordingly, the query optimizer may evaluate different query execution plans in order to identify an optimal query execution plan that minimizes the execution time of the query. A conventional query optimizer may rely on inaccurate or unreliable metrics and statistics when evaluating different query execution plans. For instance, a conventional query optimizer may evaluate different query execution plan based on cost metrics, even though the estimated cost of a query execution plan is prone to estimation errors and rarely corresponds to the true runtime cost of the query execution plan. As such, a conventional query optimizer relying on cost metrics may select a sub-optimal query execution plan that needlessly protracts the execution time of the query.

In some example embodiments, a query optimizer may be configured to identify an optimal query execution plan based on one or more robustness metrics instead relying merely on cost metrics. The robustness value of a query execution plan may indicate how stable the cost of each operator in the query execution plan is relative to variability in the output cardinality of each of the operators in the query execution plan. As used herein, the overall cost of a query execution plan may include a quantity of time and/or a quantity of computational resources (e.g., percentage of central processing unit (CPU) and/or the like) required to perform each operator included in the query execution plan. Meanwhile, the output cardinality of an operator included in the query execution plan may correspond to an output size (e.g., quantity of rows and/or the like) of that operator. While the overall cost of a query execution plan may depend on the output cardinalities of the different operators in the query execution plan, a change in one or more of these cardinalities may trigger less change in the overall cost of a more robust query execution plan than in the overall cost of a less robust query execution plan. Accordingly, the query optimizer may be configured to identify a robust query execution plan as the optimal query execution plan for executing a query because the robust query execution plan may provide superior performance even if the query optimizer is unable to estimate the output cardinalities of the operators in the query execution plan accurately.

As noted, a query execution plan may include a sequence of operators. Accordingly, the overall robustness value of the query execution plan may include the individual robustness value for each operator included in the query execution plan. For example, the overall robustness value of the query execution plan may correspond to a sum of the robustness values of the operators included in the query execution plan. Furthermore, in some example embodiments, the robustness value associated with each operator may further be assigned a weight corresponding to how prone each operator is to cardinality estimation errors.

In some example embodiments, the one or more robustness metrics may include a cardinality-slope robustness metric. The cardinality-slope robustness value of an operator may correspond to a slope of a parametric cost function (PCF), which may be a monotonically increasing and differentiable function modeling the total cost of a query execution plan including the operator as a function of the output cardinality of the operator. Moreover, the slope of this parametric cost function may be moderate for a query execution plan whose total cost is stable relative to variability in the output cardinality of the operator. Meanwhile, the overall cardinality-slope robustness value of a query execution plan may be a sum of the individual cardinality-slope robustness values of every operator included in the query execution plan. A query execution plan having a lower overall cardinality-slope robustness value may be more robust than a query execution plan having a higher overall cardinality-slope robustness value. Accordingly, the query optimizer may be configured to identify a query execution plan having a lowest cardinality-slope robustness value as the optimal query execution plan for executing a query.

In some example embodiments, the one or more robustness metrics may include a selectivity-slope robustness metric. The selectivity-slope robustness value of an operator may correspond to a slope of a parametric cost function (PCF), which may be a monotonically increasing and differentiable function modeling the total cost of a query execution plan including the operator as a function of the selectivity of the operator. As used herein, the selectivity of an operator may correspond to a ratio of an output size of the operator relative to a maximum output size of the operator, which may correspond to an input size of the operator. Accordingly, the selectivity of an operator may be a ratio of a quantity of rows in the output of the operator relative to a quantity of rows in the input of the operator. Meanwhile, the overall selectivity-slope robustness value of a query execution plan may be a sum of the individual selectivity-slope robustness values of every operator included in the query execution plan. A query execution plan having a lower overall selectivity-slope robustness value may be more robust than a query execution plan having a higher overall selectivity-slope robustness value. The query optimizer may be configured to identify a query execution plan having a lowest selectivity-slope robustness value as the optimal query execution plan for executing a query.

In some example embodiments, the one or more robustness metrics may include a cardinality-integral robustness metric. The cardinality-integral robustness value of an operator may correspond to an integral of a parametric cost function (PCF) modeling the total cost of a query execution plan including the operator as a function of the output cardinality of the operator. The integral of the parametric cost function may bound between a lower cardinality bound and an upper cardinality bound. Meanwhile, the overall cardinality-integral robustness value of a query execution plan may be a sum of the individual cardinality-integral robustness values of every operator included in the query execution plan. The overall cardinality-integral robustness value of a query execution plan may reflect a tradeoff between the robustness of the query execution plan and the cost of the query execution plan. For instance, the cost of a robust query execution plan may nevertheless be high while the cost of a query execution plan may remain sufficiently low. Accordingly, in order to select an optimal plan that is robust as well as cheap, the query optimizer may be configured to identify a query execution plan having a lowest overall cardinality-integral robustness value as the optimal query execution plan for executing a query.

FIG. 1 depicts a system diagram illustrating a database system 100, in accordance with some example embodiments. Referring to FIG. 1, the database system 100 may include a database management system 110 coupled with a database 120. The database 120 may be any type of database including, for example, a graph database, an in-memory database, a relational database, a non-SQL (NoSQL) database, and/or the like. As shown in FIG. 1, the database management system 110 may be communicatively coupled with one or more clients including, for example, a client 130 and/or the like. The client 130 may be any processor-based device including, for example, a workstation, a desktop computer, a laptop computer, a tablet computer, a mobile device, a wearable apparatus, and/or the like. Moreover, client 130 may be communicatively coupled with the database management system 110 via a network 130. The network 130 may be any wired and/or wireless network including, for example, a wide area network (WAN), a local area network (LAN), a virtual local area network (VLAN), a public land mobile network (PLMN), the Internet, and/or the like.

Referring again to FIG. 1, the client 130 may submit, to the database management system 110, a query to retrieve data from the database 120. For example, the client 130 may submit, to the database management system 110, a structure query language (SQL) statement. Executing the query may require the database management system 100 to perform multiple operators to access and/or manipulate data records stored in one or more database tables in the database 120. Accordingly, the database management system 110 may include a query optimizer 115 configured to generate multiple query execution plans for the query, each of which enumerating a different sequence of operators for executing the query. Furthermore, the query optimizer 115 may the different query execution plans to identify an optimal query execution plan for executing the query. For instance, an optimal query execution plan may minimize the execution time associated with the query. Accordingly, the database management system 110 may execute the query in accordance with the optimal query execution plan.

In some example embodiments, the query optimizer 110 may evaluate a query execution plan based on one or more robustness metrics indicative of how stable the total cost of the query execution plan is relative to variability in the output cardinality of each of the operators in the query execution plan. For example, the one or more robustness metrics may include a cardinality-slope robustness metric, a selectivity-slope robustness metric, a cardinality-integral robustness metric, and/or the like. The overall robustness value of a query execution plan may correspond to a sum of the individual robustness values associated with the intermediate results of each operator included in the query execution plan.

The cost of an operator in a query execution plan may include a quantity of time and/or a quantity of computational resources (e.g., percentage of central processing unit (CPU) and/or the like) required to perform operator. Meanwhile, the output cardinality of an operator in a query execution plan may correspond to an output size (e.g., quantity of rows and/or the like) of the operator included in the query execution plan. The robustness value of an operator may therefore express a first change in the cost of the operator relative to a second change in the output cardinality of the operator. As noted, the overall robustness value of a query executive plan may correspond to a sum of the individual robustness values associated with the intermediate results of each operator included in the query execution plan. A more robust query execution plan may be associated with a lower robustness value than a less robust query execution plan indicating that a change in the output cardinality of one or more operators may trigger less change in the cost of the more robust query execution plan than in the cost of the less robust query execution plan. The query optimizer 110 may identify a robust query execution plan having the lowest robustness value as the optimal query execution plan because the performance of the robust query execution plan may remain superior even when the query optimizer fails to estimate the output cardinality of the query execution plan accurately.

Figure 2A:
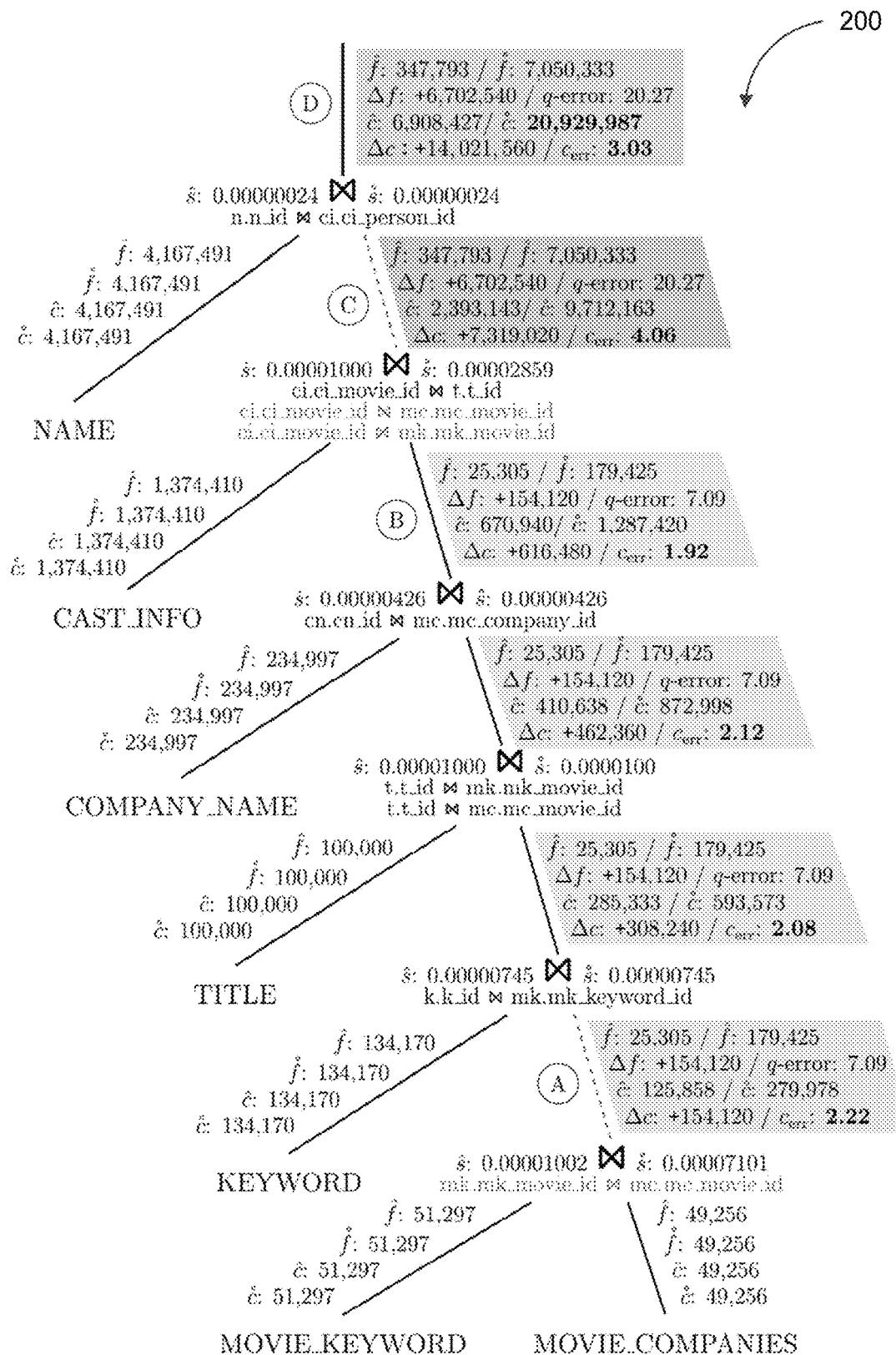
FIG. 2A depicts an example of a query execution plan, in accordance with some example embodiments.
Figure 2B:
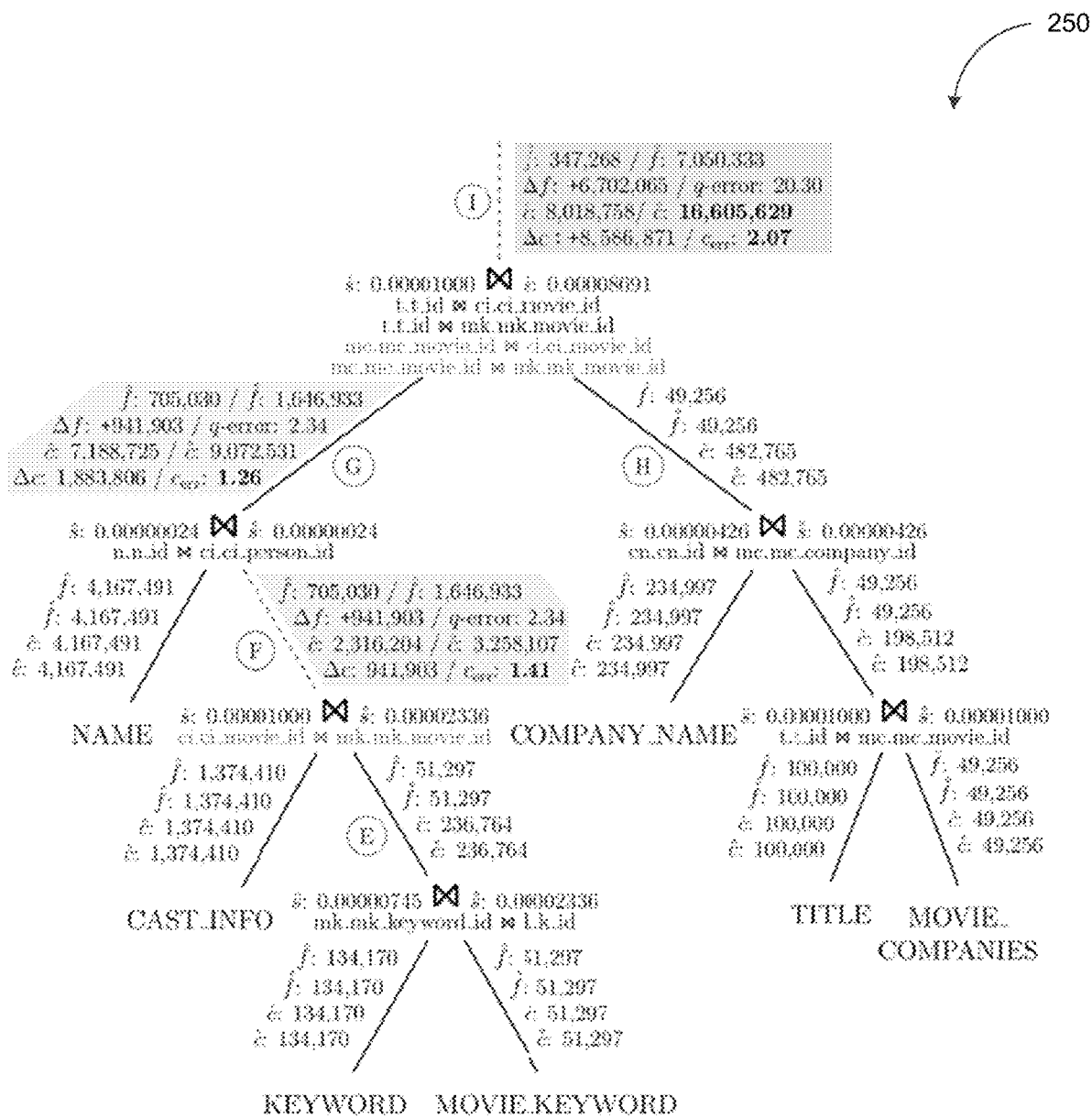
FIG. 2B depicts another example of a query execution plan, in accordance with some example embodiments.

To further illustrate, FIG. 2A depicts example of a query execution plan 200, in accordance with some example embodiments. FIG. 2B depicts another example of a query execution plan 250, in accordance with some example embodiments. The query optimizer 110 may generate the query execution plan 200 and the query execution plan 250 for a query joining name, cast info, title, movie keyword, keyword, movie companies, and company name. Referring to FIGS. 2A-B, each node in the query execution plan 200 and the query execution plan 250 may represent an operator. Meanwhile, each edge present in query execution plan 200 and the query execution plan 250 may represent an intermediate result of an operator included in the query execution plan 200 or the query execution plan 250. Accordingly, each node and/or edge in the query execution plan 200 and the query execution plan 250 may be associated with one or more estimated statistics (e.g., estimated cost $\hat{c}$, estimated cardinality $\hat{f}$, estimated selectivity $\hat{s}$, and/or the like) as well as one or more true statistics (e.g., true cost $\dot{c}$, true cardinality $\dot{f}$, true selectivity $\dot{s}$, and/or the like) for the corresponding operation.

Referring to FIGS. 2A-B, the query execution plan 200 may be less robust than the query execution plan 250. Nevertheless, if the query optimizer 115 evaluates the query execution plan 200 and the query execution plan 250 based on cost alone, the query optimizer 115 may select the query execution plan 200 as the optimal plan for executing the query. However, as FIG. 2A shows, the query optimizer 110 may be unable to determine the true cost of the query execution plan 200 accurately. As such, the query optimizer 110 may select the query execution plan 200 even though the true runtime cost of the query execution plan 200 may be sub-optimal.

For example, as shown in FIG. 2A, the true statistics of the final edge Ⓑ indicate that the true cardinality $\dot{f}$ of the query execution plan 200 may be underestimated by a factor of 20.27. That is, the estimated cardinality $\hat{f}$ of the query execution plan 200 may be associated with a q-error of 20.27. This underestimation in the true cardinality $\dot{f}$ of the query execution plan 200 may stem from an underestimation of the true cardinality $\dot{f}$ of the edge Ⓐ and the true cardinality $\dot{f}$ of the edge Ⓒ. For instance, the estimated cardinality $\hat{f}$ of the edge Ⓐ and the estimated cardinality $\hat{f}$ of the edge Ⓒ may be skewed by erroneous assumptions on data distribution, column correlation, join relationship, and/or the like. Moreover, the underestimation in the true cardinality $\dot{f}$ of the query execution plan 200 may contribute to an underestimation in the true cost $\dot{c}$ of the query execution plan 200. For example, as shown in FIG. 2A, the estimated cost $\hat{c}$ of the query execution plan 200 may be associated with a cost error factor $C_{err}$ of 3.03.

While the query execution plan 250 shown in FIG. 2B may be associated with a higher estimated cost ĉ than the query execution plan 200 shown in FIG. 2A, the query execution plan 250 may nevertheless be more optimal than the query execution plan 200 because the true cost ċ of the query execution plan 250 may remain relatively stable even as the output cardinalities of the operators included in the query execution plan 250 vary. For instance, FIG. 2B shows the cost error factor $C_{err}$ of the query execution plan 250 being lower than the cost error factor $C_{err}$ of the query execution plan 200. The lower cost error factor $C_{err}$ of the query execution plan 250 may reflect the robustness of the query execution plan 250. That is, being a more robust query execution plan, the estimated cost ĉ of the query execution plan 250 may correspond to the true cost ċ of the query execution plan 250 even when the underling estimated cardinality f of the query execution plan 250 deviates from the true cardinality f of the query execution plan 250.

Figure 2C:
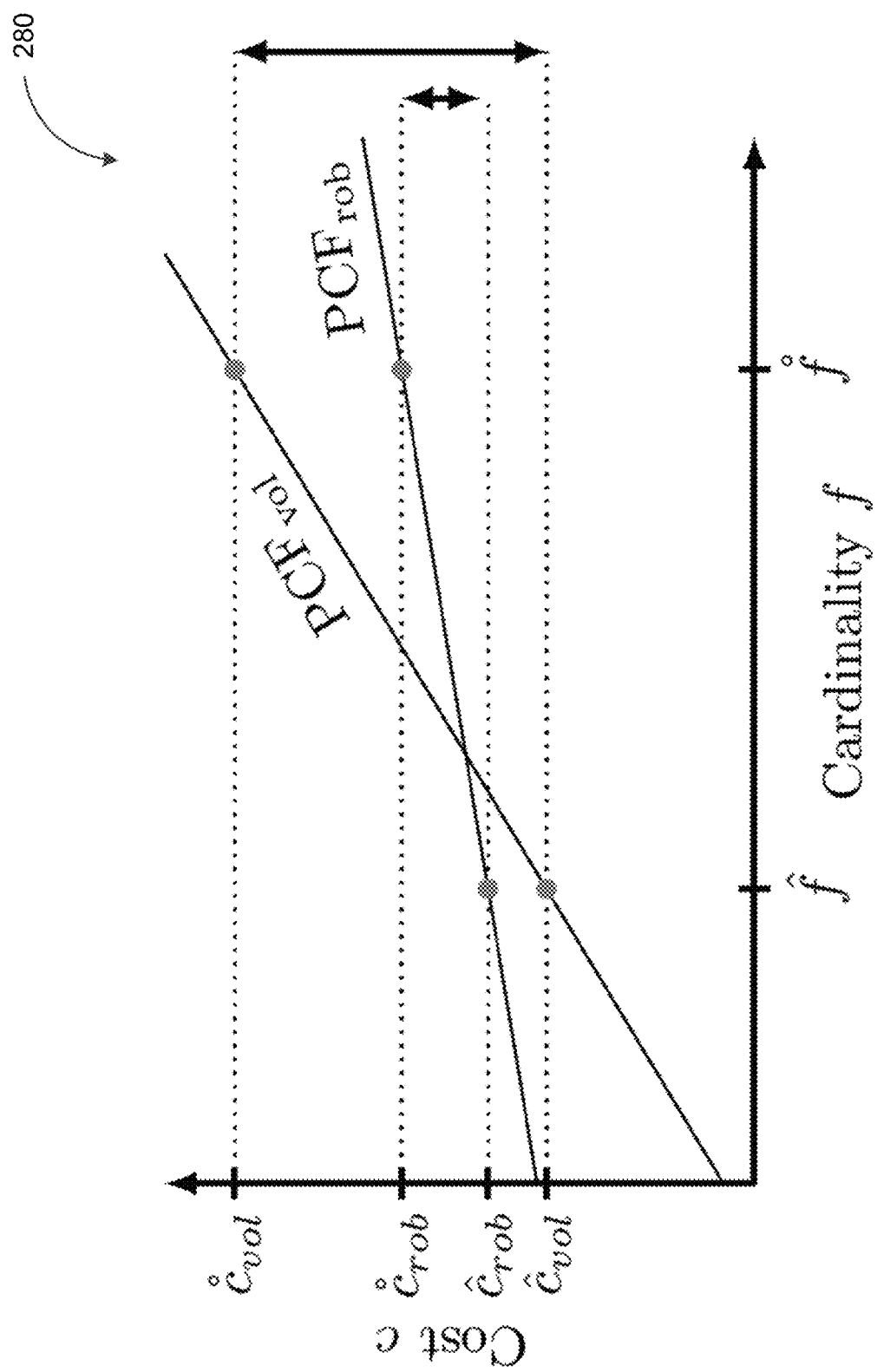
FIG. 2C depicts a graph illustrating a cost behavior of different query execution plans, in accordance with some example embodiments.

To further illustrate, FIG. 2C depicts a graph 280 illustrating a cost behavior of different query execution plans, in accordance with some example embodiments. Referring to FIGS. 2A-C, the graph 280 may depict a parametric cost function ($PCF_{vol}$) of a volatile query execution plan such as, for example, the query executing plan 200 shown in FIG. 2A. The parametric cost function ($PCF_{vol}$) of the volatile query execution plan may model the cost of the volatile query execution plan as a function of the output cardinality of the volatile query execution plan. The graph 280 may also depict a parametric cost function ($PCF_{rob}$) of a robust query execution plan such as, for example, the query execution plan 250. The parametric cost function ($PCF_{rob}$) of the robust query execution plan may model the cost of the robust query execution plan as a function of the output cardinality of the query execution plan.

As shown in FIG. 2C, the cost of the robust query execution plan may be less susceptible to variability in the output cardinality of the robust query execution plan which may arise, for example, as a result of estimation errors. For example, FIG. 2C shows a relatively small difference between the true cost $ċ_{rob}$ of the robust query execution plan, which may correspond to the true cardinality f̂ of the robust query execution plan, and the estimated cost $ĉ_{rob}$ of the robust query execution plan determined based on the estimated cardinality f̂ of the robust query execution plan. Contrastingly, FIG. 2C shows a relatively large difference between the true cost $ċ_{vol}$ of the volatile query execution plan corresponding to the true cardinality f of the volatile query execution plan and the estimated cost $ĉ_{01}$ of the volatile query execution plan determined based on the estimated cardinality f̂ of the volatile query execution plan. Accordingly, in some example embodiments, the query optimizer 110 may be configured to select the robust query execution plan instead of the volatile query execution plan as the optimal query execution plan for a query.

In order to identify a more robust query execution plan, the query optimizer 110 may be configured to evaluate different query execution plans based on one or more robustness metrics including, for example, a cardinality-slope robustness metric, a selectivity-slope robustness metric, a cardinality-integral robustness metric, and/or the like. In some example embodiments, the query optimizer 110 may determine, for a query execution plan, an overall robustness value that corresponds to a weighted sum of the individual robustness value of each operator included in the query execution plan. For example, the overall robustness value of a query execution plan that includes a first operator and a second operator may correspond to a weighted sum of the respective robustness values of the first operator and the second operator. The weight applied to the respective robustness values of the first operator and the second operator may be a value (e.g., between 0.0 and 1.0) that reflects the risk of cardinality estimation errors associated with each of the first operator and the second operator. For instance, an operator that is more prone to cardinality estimation errors (e.g., an m: n join) may be assigned a larger weight (e.g., 1.0) while an operator that is less prone to cardinality estimation errors (e.g., a foreign key join) may be assigned a smaller weight (e.g., 0.0).

Figure 3A:
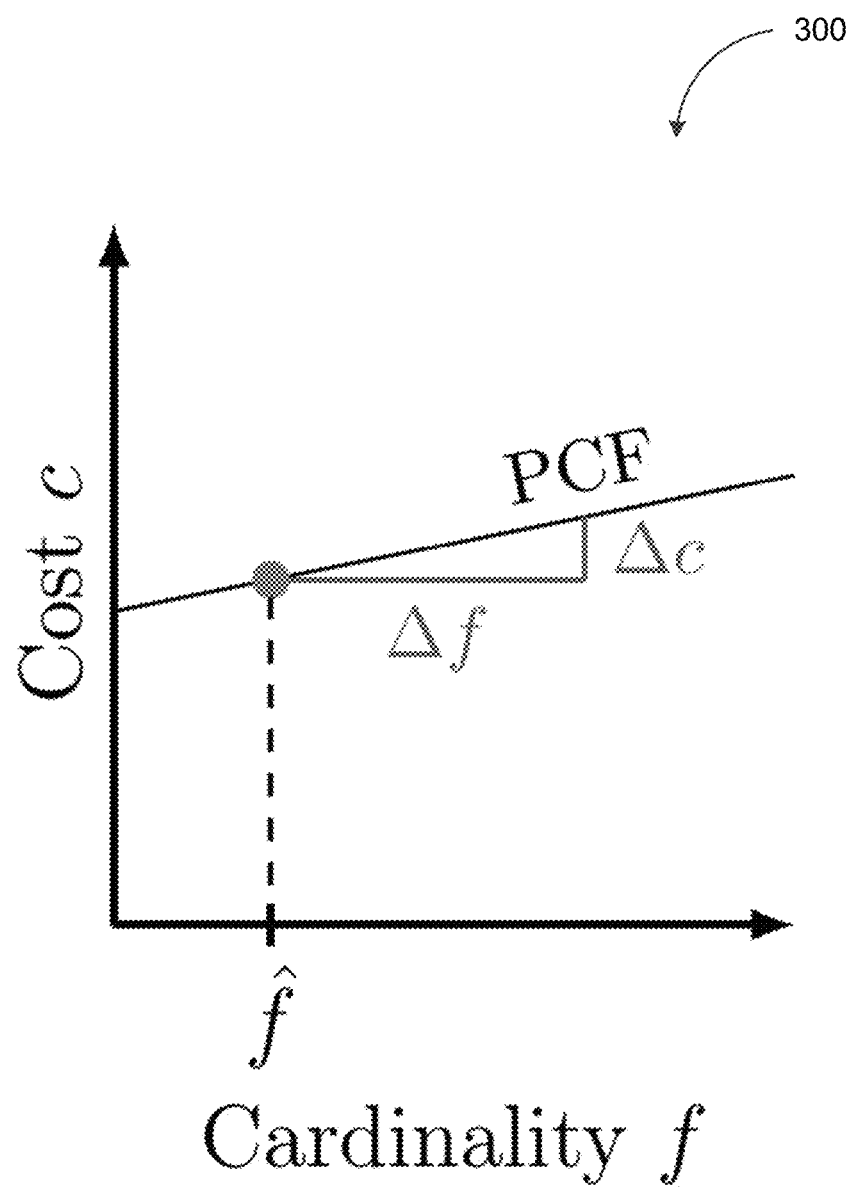
FIG. 3A depicts a graph illustrating a cardinality-slope robustness metric, in accordance with some example embodiments.

In some example embodiments, the query optimizer 110 may identify a query execution plan as an optimal query execution plan for a query based on the overall cardinality-slope robustness value of the query execution plan. FIG. 3A depicts a graph 300 illustrating a cardinality-slope robustness metric, in accordance with some example embodiments. As shown in FIG. 3A, the cardinality-slope robustness value of an operator in a query execution plan may correspond to a slope (e.g., $$\frac{\Delta c}{\Delta f}$$

of a parametric cost function (PCF), which may be a monotonically increasing and differentiable function modeling the total cost c of a query execution plan as a function of the output cardinality f of an operator included in the query execution plan. The output cardinality f of the operator may correspond to an output size (e.g., quantity of rows and/or the like) of the operator. Meanwhile, the cost c of the operator may correspond to a quantity of time and/or a quantity of computational resources (e.g., percentage of central processing unit (CPU) and/or the like) required to perform the operator.

As Equation (1) below shows, the overall cardinality-slope robustness value of a query execution plan may correspond to a weighted sum of the respective cardinality-slope robustness values of each operator included in the query execution plan.

$$r_{\delta f}(P) = \Sigma_{e \in E_P} \varphi(e) \cdot \delta_{f,e} \quad (1)$$

wherein $r_{\delta f}$ may denote an overall cardinality-slope robustness value of a query execution plan P, $e \in E_P$ may denote each edge corresponding to an intermediate result of an operator included in the query execution plan P, $\delta_{f,e}$ may denote the cardinality-slope robustness value of each edge $e \in E_P$, and φ may denote a weighting function φ: $E_P \rightarrow [0.0, 1.0]$ configured to assign each edge $e \in E_P$ to a weight valued between [0.0, 1.0] that reflects the risk of cardinality estimation errors associated with the corresponding operator.

It should be appreciated that the overall cardinality-slope robustness value $r_{\delta f}$ of the query execution plan P may be inversely proportional to the robustness of the query execution plan P. That is, a query execution plan having a higher cardinality-slope robustness value may be less robust than a query execution plan having a lower cardinality-slope robustness value. Accordingly, the query optimizer 115 may select, as the optimal query execution plan for a query, the query execution plan having the lowest overall cardinality-slope robustness value.

Figure 3B:
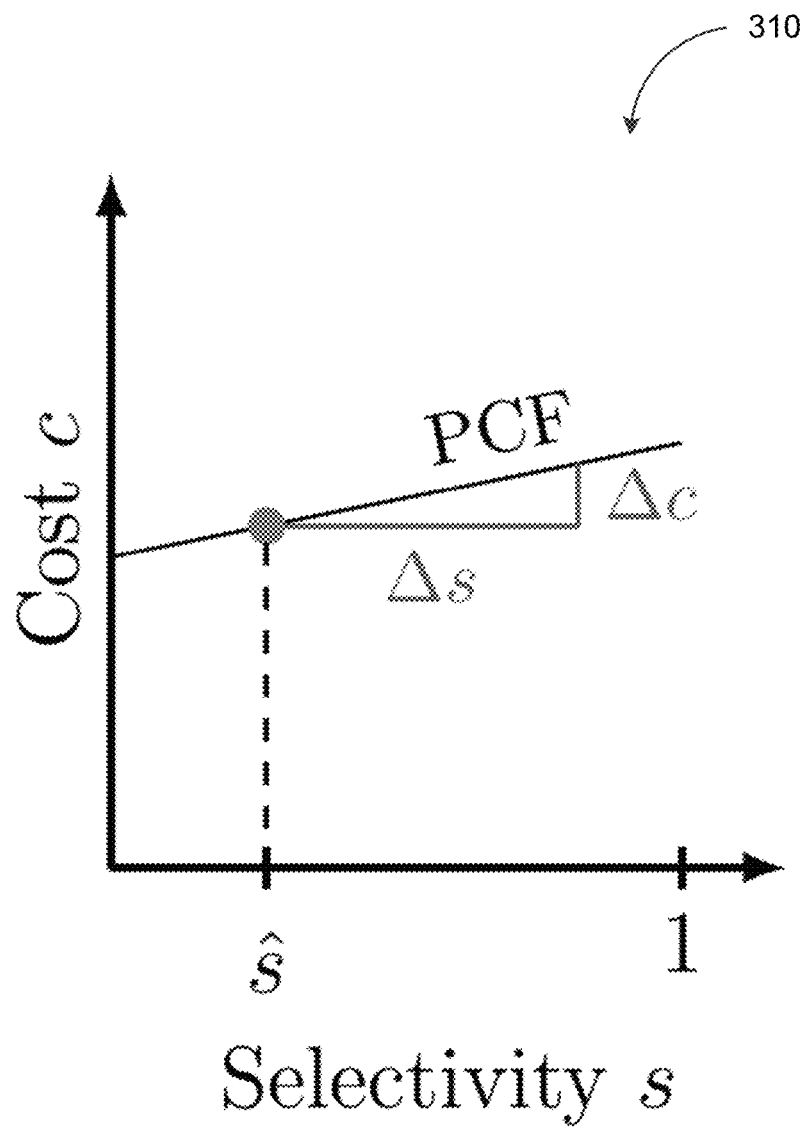
FIG. 3B depicts a graph illustrating a selectivity-slope robustness metric, in accordance with some example embodiments.

In some example embodiments, the query optimizer 110 may identify a query execution plan as an optimal query execution plan for a query based on the overall selectivity-slope robustness value of the query execution plan. FIG. 3B depicts a graph 310 illustrating a selectivity-slope robustness metric, in accordance with some example embodiments. As shown in FIG. 3B, the selectivity-slope robustness value of an operator may correspond to a slope (e.g., $$\frac{\Delta c}{\Delta s}$$

of a parametric cost function (PCF), which may be a monotonically increasing and differentiable function modeling the total cost c of a query execution plan as a function of the selectivity s of an operator include in the query execution plan. The selectivity s of the operator may correspond to a ratio of an output size of the operator relative to a maximum output size of the operator. Meanwhile, the cost c of the operator may correspond to a quantity of time and/or a quantity of computational resources (e.g., percentage of central processing unit (CPU) and/or the like) required to perform the operator.

The overall selectivity-slope robustness value of a query execution plan may be determined based on Equation (2) below. As Equation (2) shows, the overall selectivity-slope robustness value of the query execution plan may correspond to a weighted sum of the respective selectivity-slope robustness values of each operator included in the query execution plan.

$$r_{\delta s}(P)=\Sigma_{op \in O_P}\phi(op) \cdot \delta_{s,op} \quad (2)$$

wherein $r_{\delta s}$ may denote an overall selectivity-slope robustness value of a query execution plan P, $op \in O_P$ may denote each operator included in the query execution plan P, $\delta_{s,op}$ may denote the selectivity-slope robustness value of each operator $op \in O_P$, and $\phi$ may denote a weighting function $\phi$: $O_P \rightarrow [0.0, 1.0]$ configured to assign each operator $op \in O_P$ to a weight valued between [0.0, 1.0] that reflects the risk of cardinality estimation errors associated with the operator.

The overall selectivity-slope robustness value $r_{\delta s}$ of the query execution plan P may be inversely proportional to the robustness of the query execution plan P. Accordingly, a query execution plan having a higher overall selectivity-slope robustness value may be less robust than a query execution plan having a lower overall selectivity-slope robustness value. As such, in some example embodiments, the query optimizer 115 may select, as the optimal query execution plan for a query, the query execution plan having the lowest overall selectivity-slope robustness value.

Figure 3C:
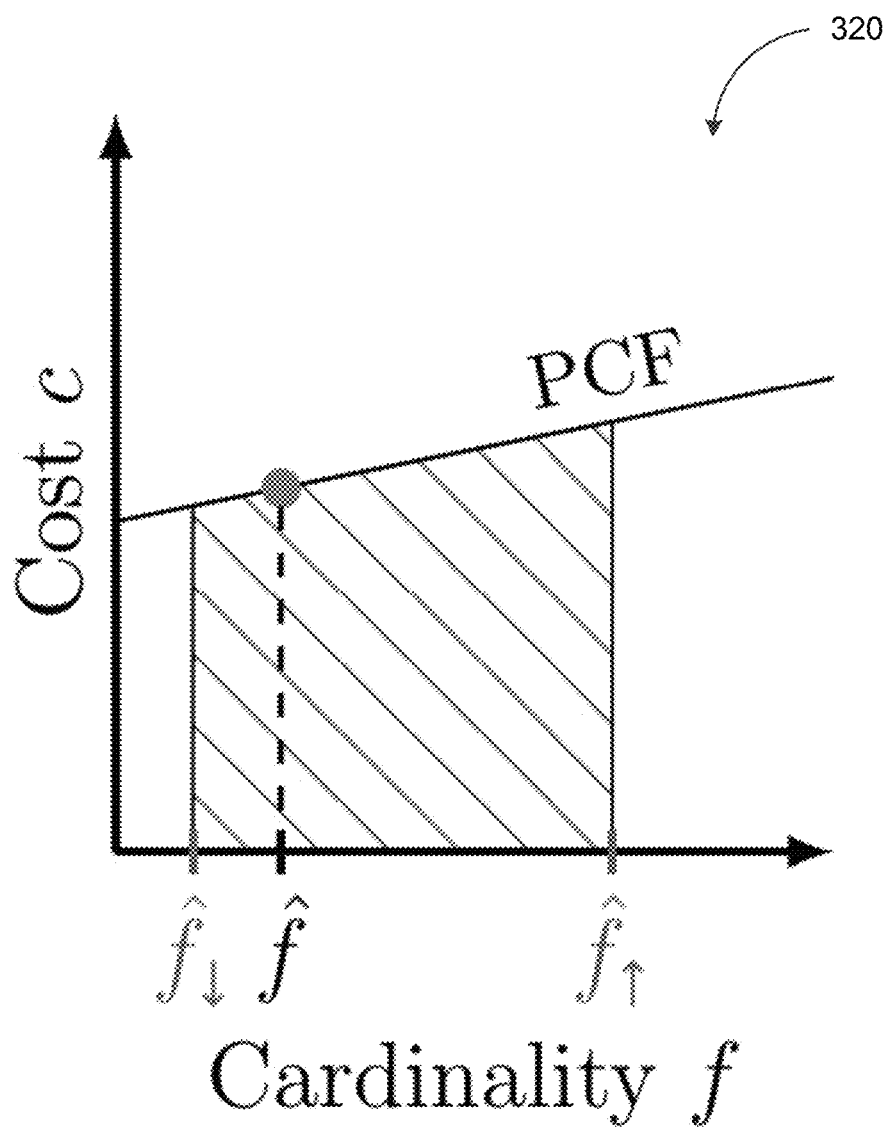
FIG. 3C depicts a graph illustrating a cardinality-integral robustness metric, in accordance with some example embodiments.

In some example embodiments, the query optimizer 110 may identify a query execution plan as an optimal query execution plan for a query based on the overall cardinality-integral robustness value of a query execution plan. FIG. 3C depicts a graph 320 illustrating a cardinality-integral robustness metric, in accordance with some example embodiments. Referring to FIG. 3C, the cardinality-integral robustness value of an operator in a query execution plan may correspond to an integral of a parametric cost function (PCF) modeling the total cost c of a query execution plan as a function of the output cardinality f of an operator included in the query execution plan. The cardinality-integral robustness value of the operator may further be determined between a lower cardinality bound $f_\downarrow$ and an upper cardinality bound $f_\uparrow$. Accordingly, FIG. 3C shows the cardinality-integral robustness value of the operator as corresponding to an area under the parametric cost function (PCF) of the operator between the lower cardinality bound $f_\downarrow$ and the upper cardinality bound $f_\uparrow$.

The cardinality-integral robustness value of a query execution plan may be determined based on Equation (3) below. As Equation (3) shows, the overall cardinality-integral robustness value of the query execution plan may correspond to a weighted sum of the respective cardinality-integral robustness value of each operator included in the query execution plan.

$$r_{\int f}(P)=\Sigma_{e \in E_P}\phi(e) \cdot \int_{f,e} \quad (2)$$

wherein $r_{\int f}$ may denote an overall cardinality-integral robustness value of a query execution plan P, $e \in E_P$ may denote each edge corresponding to an intermediate result of an operator included in the query execution plan P, $\int_{f,e}$ may denote the cardinality-integral robustness value of each edge $e \in E_P$, and $\phi$ may denote a weighting function $\phi$: $E_P \rightarrow [0.0, 1.0]$ configured to assign each edge $e \in E_P$ to a weight valued between [0.0, 1.0] that reflects the risk of cardinality estimation errors associated with the corresponding operator.

According to some example embodiments, the overall cardinality-integral robustness value of the query execution plan P may reflect a tradeoff between the robustness r of the query execution plan and the cost c of the query execution plan. For instance, as noted, the cost c of the query execution plan may remain low even when the slope of the parametric cost function is relatively steep. That is, the cost of a less robust query execution plan having a high cardinality-slope robustness value may nevertheless be the same as or even less than the cost of a more robust query execution plan having a low cardinality-slope robustness value. As such, instead of and/or in addition to evaluating the cardinality-slope robustness value and/or the selectivity-slope robustness value of a query execution plan, the query optimizer 110 may consider the cardinality-integral robustness value of the query execution plan. For example, the query optimizer 110 may identify, as the optimal query execution plan for a query, a query execution plan having the lowest cardinality-integral robustness value. In doing so, the query optimizer 110 may select the most robust as well as the least costly query execution plan for the query between the lower cardinality bound $f_\downarrow$ and the upper cardinality bound $f_\uparrow$.

Figure 4:
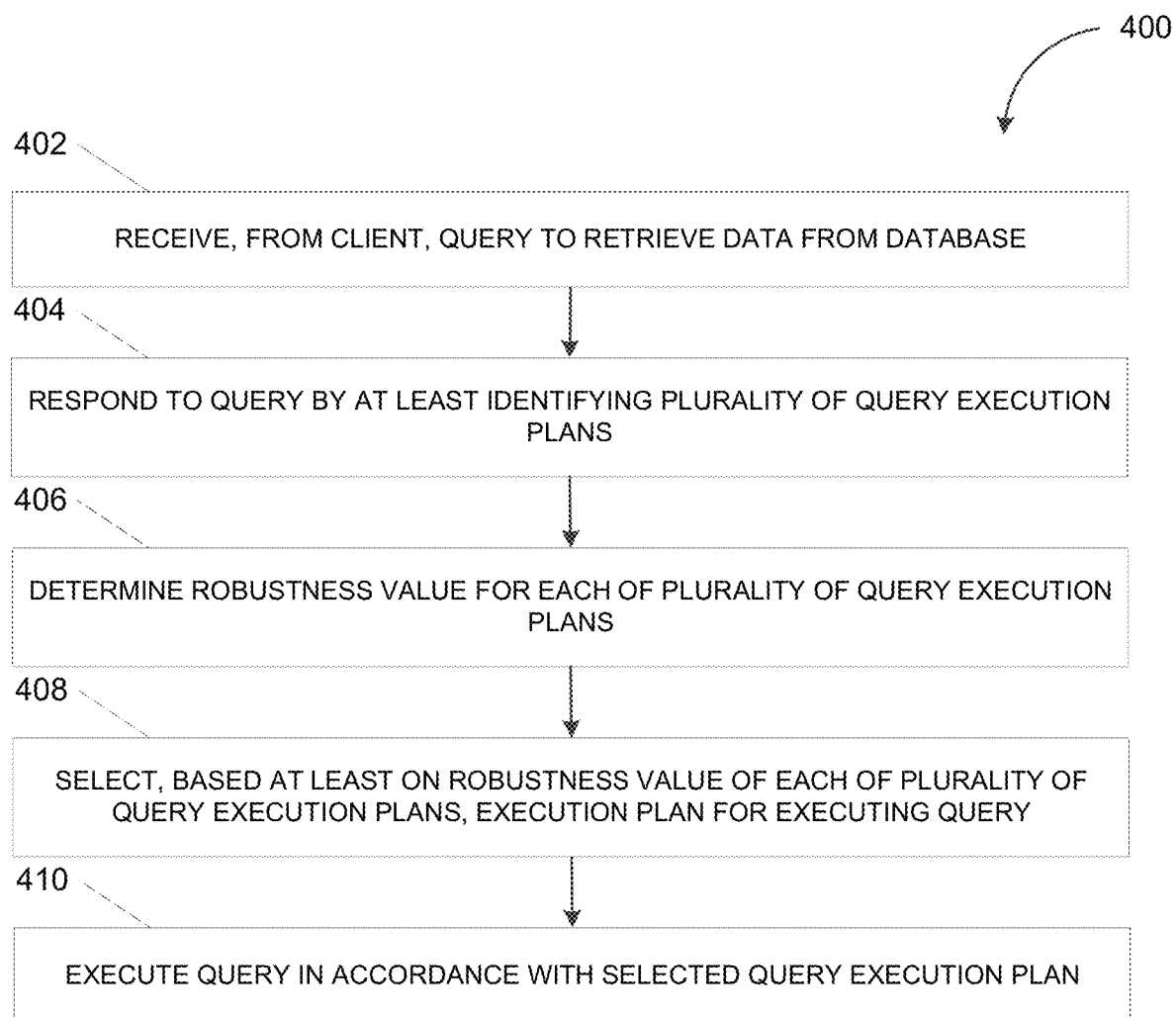
FIG. 4 depicts a flowchart illustrating a process for executing a query in a database, in accordance with some example embodiments.

FIG. 4 depicts a flowchart illustrating a process 400 for executing a query in a database, in accordance with some example embodiments. Referring to FIGS. 1, 2A-C, 3A-C, and 4, the process 400 may be performed by the database management system 110 in order to execute query to retrieve data from the database 120.

At 402, the database management system 110 may receive, from the client 130, a query to retrieve data from the database 120. For example, the client 130 may send, to the database management system 110, a query joining name, cast info, title, movie keyword, keyword, movie companies, and company name from one or more database tables stored in the database 120.

At 404, the database management system 110 may respond to the query by at least identifying a plurality of query execution plans. In some example embodiments, the database management system 110, for example, the query optimizer 115, may respond to the query by at least identifying a k quantity of query execution plans that may be used to execute the query. For instance, the query optimizer 15 may identify a k quantity of the lowest cost query execution plans for the query joining the name, cast info, title, movie keyword, keyword, movie companies, and company name from one or more database tables stored in the database 120. Alternatively and/or additionally, the query optimizer 115 may identify a k quantity of query execution plans whose cost do not exceed the cost of the lowest cost query execution plan by a threshold value. The k quantity of query execution plans may include, for example, the query execution plan 200, the query execution plan 250, and/or the like.

At 406, the database management system 110 may determine a robustness value for each of the plurality of query execution plans. In some example embodiments, the database management system 110, for example, the query optimizer 115, may determine one or more robustness values for each of the k quantity of query execution plans. For example, the query optimizer 115 may determine, for each of the k quantity of query execution plans, a cardinality-slope robustness value, a selectivity-slope robustness value, and/or a cardinality-integral robustness value.

As noted, the overall robustness value of a query execution plan may correspond to a sum of the individual robustness values of the operators included in the query execution plan. Meanwhile, the robustness value of an operator may indicate how stable the cost of the operator is relative to variability in the output cardinality of the operator. For example, the cardinality-slope robustness value of an operator may correspond to a slope of a parametric cost function (PCF) modeling the cost of the operator as a function of the output cardinality of the operator. The slope of this parametric cost function may be moderate if the cost of the operator remains stable relative to variability in the output cardinality of the operator. Alternatively, the selectivity-slope robustness value of the operator may correspond to a slope of a parametric cost function (PCF) modeling the cost of the operator as a function of the selectivity of the operator. The slope of this parametric cost function may also be moderate if the cost of the operator remains stable relative to variability in the output cardinality of the operator.

Meanwhile, the cardinality-integral robustness value of an operator in a query execution plan may correspond to an area beneath of the parametric cost function (PCF) modeling the cost of the operator as a function of the output cardinality of the operator. As shown in FIG. 3C, this area may be bound between the lower cardinality bound $f_\downarrow$ and the upper cardinality bound $f_\uparrow$. The overall cardinality-integral robustness value of a query execution plan be a sum of the individual cardinality-integral robustness values of the operators included in the query execution plan. This overall cardinality-integral robustness value may reflect the tradeoff between the robustness of the query execution plan and the overall cost of the query execution plan. For instance, the cost of a volatile query execution plan may remain low while the cost of a robust query execution plan may nevertheless be high. Accordingly, the query optimizer 110 may evaluate the cardinality-integral robustness value of the query execution plan in order to avoid selecting a robust query execution plan that is in fact more costly than a less robust query execution plan.

At 408, the database management system 110 may select, based at least the robustness value for each of the plurality of query execution plans, a query execution plan for executing the query. In some example embodiments, the database management system 110, for example, the query optimizer 115, may select, as the optimal query execution plan for the query, a query execution plan having the lowest robustness value. Alternatively and/or additionally, the database management system may select, as the optimal query execution plan, a query execution plan whose robustness value does not exceed a threshold value (e.g., 3.49 or a different threshold value). The database management system 110 may select the optimal query execution plan based on the robustness values of different query execution plans instead of and/or in addition to the cost of the query execution plans. For example, the database management system 110 may determine that the optimal query execution plan for the query may be the query execution plan 250 and not the query execution plan 200 because the query execution plan 250 may be associated with the lowest cardinality-slope robustness value, selectivity-slope robustness value, and/or cardinality-integral robustness value.

At 410, the database management system 110 may execute the query in accordance with the selected query execution plan. For example, the database management system 110 may execute, based on the query execution plan 250, the query to join the name, cast info, title, movie keyword, keyword, movie companies, and company name from one or more database tables stored in the database 120. Executing the join query may include performing, in the order set forth in the query execution plan 250, the sequence of operators in the query execution plan 250. The database management system 110 may execute the join query based on the query execution plan 250 instead of the query execution plan 200 because the query execution plan 250 is more robust than the query execution plan 200. The cost of the more robust query execution plan 250, being more tolerant to cardinality estimation errors, may remain more stable than the cost of the query execution plan 200. Accordingly, the performance of the query execution plan 250 may be superior even if the query execution plan 250 is selected based on an erroneous estimate of its cardinality.

Figure 5:
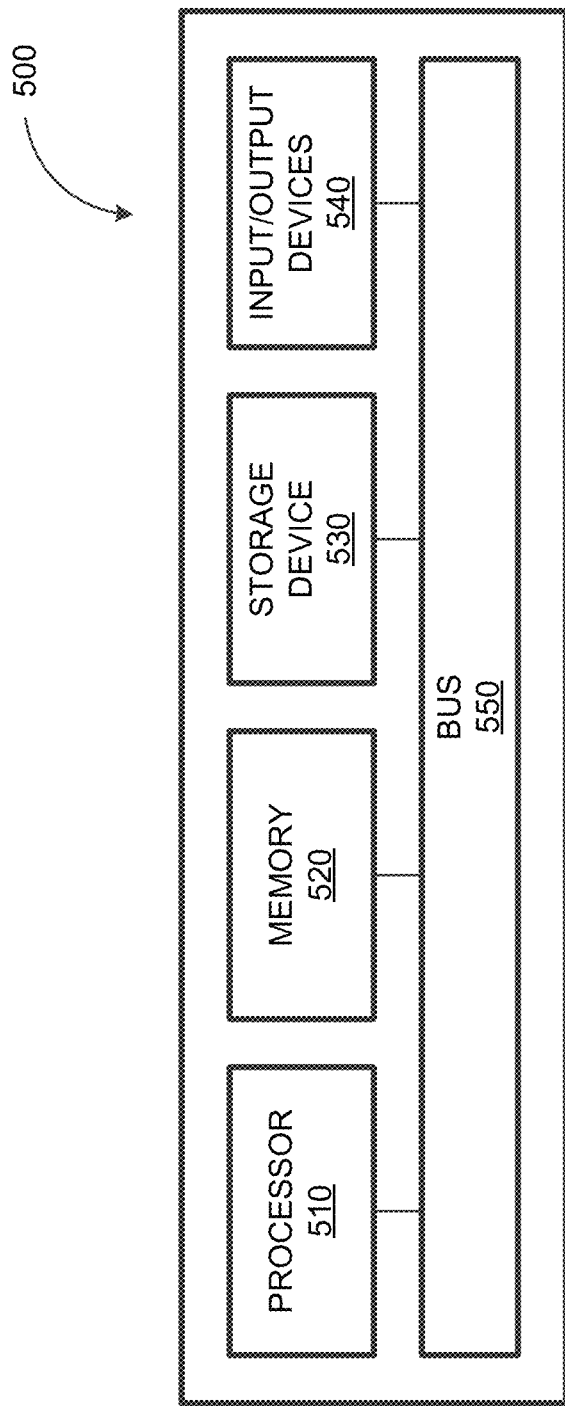
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 100 and/or any components therein including, for example, the timestamp access controller 140.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110 including, for example, the timestamp access controller 140. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operators for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operators for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operators comprising:
   responding to a query to retrieve data from a database by at least identifying a plurality of query execution plans;
   determining, for each of the plurality of query execution plans, an overall robustness value corresponding to a sum of an individual robustness value associated with each operator included in the query execution plan;

selecting, based at least on the overall robustness value of each of the plurality of query execution plans, one of the plurality of query execution plan for executing the query; and executing the query in accordance with the selected one of the plurality of query execution plan, the query being executed by at least performing a sequence of operators included in the selected one of the plurality of query execution plan.

2. The system of claim 1, wherein the individual robustness value comprises a cardinality-slope robustness value, and wherein the cardinality-slope robustness value of each operator corresponds to a slope of a parametric cost function modeling a total cost of the query execution plan including the operator relative to an output cardinality of the operator.

3. The system of claim 1, wherein the individual robustness value comprises a selectivity-slope robustness value, wherein the selectivity-slope robustness value of each operator corresponds to a slope of a parametric cost function modeling a total cost of the query execution plan including the operator relative to a selectivity of the operator, and wherein the selectivity of the operator corresponds to an output size of the operator relative to a maximum output size of the operator.

4. The system of claim 1, wherein the individual robustness value comprises a cardinality-integral robustness value, wherein the cardinality-integral robustness value of the each operator corresponds to an integral of a parametric cost function modeling the total cost of a query execution plan including the operator relative to an output cardinality of the operator, and wherein the integral is bound between a lower cardinality bound and an upper cardinality bound.

5. The system of claim 1, wherein the overall robustness value of the query execution plan comprises a weighted sum of the individual robustness value associated with each operator included in the query execution plan, and wherein a first operator included in the query execution plan is assigned a higher weight than a second operator included in the query execution plan based at least on the first operator being more prone to a cardinality estimation error than the second operator.

6. The system of claim 1, wherein the one of the plurality of query execution plans is selected based at least on the one of the plurality of query execution plans having a lowest overall robustness value.

7. The system of claim 1, wherein the one of the plurality of query execution plans is selected based at least on the one of the plurality of query execution plans being associated with an overall robustness value that does not exceed a threshold value.

8. The system of claim 1, wherein the query execution plan is associated with a total cost corresponding to a sum of a quantity of time and/or a quantity of computational resources required to perform each operator included in the query execution plan.

9. The system of claim 1, wherein each operator included in the query execution plan is associated with an output cardinality corresponding to an output size of the operator.

10. The system of claim 1, wherein the plurality of query execution plans are identified based at least on a cost of each of the plurality of query execution plans.

11. The system of claim 1, wherein the plurality of query execution plans comprise a threshold quantity of query execution plans having a lowest cost.

12. The system of claim 1, wherein a query execution plan is identified to be part of the plurality of query execution plans based at least on a cost of the query execution plan not exceeding a cost of a lowest cost query execution plan by a threshold value.

13. A computer-implemented method, comprising:

responding to a query to retrieve data from a database by at least identifying a plurality of query execution plans;

determining, for each of the plurality of query execution plans, an overall robustness value corresponding to a sum of an individual robustness value associated with each operator included in the query execution plan;

selecting, based at least on the overall robustness value of each of the plurality of query execution plans, one of the plurality of query execution plan for executing the query; and executing the query in accordance with the selected one of the plurality of query execution plan, the query being executed by at least performing a sequence of operators included in the selected one of the plurality of query execution plan.

14. The method of claim 13, wherein the individual robustness value comprises a cardinality-slope robustness value, and wherein the cardinality-slope robustness value of each operator corresponds to a slope of a parametric cost function modeling a total cost of the query execution plan including the operator relative to an output cardinality of the operator.

15. The method of claim 13, wherein the individual robustness value comprises a selectivity-slope robustness value, wherein the selectivity-slope robustness value of each operator corresponds to a slope of a parametric cost function modeling a total cost of the query execution plan including the operator relative to a selectivity of the operator, and wherein the selectivity of the operator corresponds to an output size of the operator relative to a maximum output size of the operator.

16. The method of claim 13, wherein the individual robustness value comprises a cardinality-integral robustness value, wherein the cardinality-integral robustness value of the each operator corresponds to an integral of a parametric cost function modeling the total cost of a query execution plan including the operator relative to an output cardinality of the operator, and wherein the integral is bound between a lower cardinality bound and an upper cardinality bound.

17. The method of claim 13, wherein the overall robustness value of the query execution plan comprises a weighted sum of the individual robustness value associated with each operator included in the query execution plan, and wherein a first operator included in the query execution plan is assigned a higher weight than a second operator included in the query execution plan based at least on the first operator being more prone to a cardinality estimation error than the second operator.

18. The method of claim 13, wherein the one of the plurality of query execution plans is selected based at least on the one of the plurality of query execution plans having a lowest overall robustness value and/or an overall robustness value that does not exceed a threshold value.

19. The method of claim 13, wherein the plurality of query execution plans comprise a threshold quantity of query execution plans having a lowest cost and/or a plurality of query execution plans whose costs do not exceed a cost of a lowest cost query execution plan by a threshold value.

20. A non-transitory computer readable medium storing instructions, which when executed by at least one data processor, result in operations comprising:

responding to a query to retrieve data from a database by at least identifying a plurality of query execution plans;

determining, for each of the plurality of query execution plans, an overall robustness value corresponding to a sum of an individual robustness value associated with each operator included in the query execution plan;

selecting, based at least on the overall robustness value of each of the plurality of query execution plans, one of the plurality of query execution plan for executing the query; and executing the query in accordance with the selected one of the plurality of query execution plan, the query being executed by at least performing a sequence of operators included in the selected one of the plurality of query execution plan.

* * * * *